United States Patent [19]

Oto

[11] 4,114,460
[45] Sep. 19, 1978

[54] PROTECTIVE BOOT
[75] Inventor: Takao R. Oto, Fresno, Calif.
[73] Assignee: Roto Manufacturing Co., Inc., Fresno, Calif.
[21] Appl. No.: 771,688
[22] Filed: Feb. 24, 1977
[51] Int. Cl.² .............................................. F16J 15/50
[52] U.S. Cl. ..................................... 74/18.2; 188/322; 277/212 FB; 280/276; 280/283
[58] Field of Search .................... 188/322, 266; 74/18, 74/18.2; 92/44, 46; 180/32; 280/275, 276, 283, 284; 277/200, 212 FB; 64/11 B, 32 F; D12/117, 118; 267/153

[56] References Cited
U.S. PATENT DOCUMENTS

| 903,465 | 11/1908 | Fulton | 74/18.2 X |
| 2,106,304 | 1/1938 | McGee | 74/18.2 X |
| 2,324,173 | 7/1943 | Porter | 92/46 X |
| 2,432,803 | 12/1947 | Rice | 74/18.1 X |
| 3,035,714 | 5/1962 | Peterson | 74/18 X |
| 3,101,131 | 8/1963 | DeCarbon et al. | 74/18.2 X |
| 3,301,575 | 1/1967 | Ryan et al. | 180/32 X |

FOREIGN PATENT DOCUMENTS 582,316  11/1976  Switzerland .......................... 267/153

Primary Examiner—George E. A. Halvosa
Attorney, Agent, or Firm—Huebner & Worrel

[57] ABSTRACT

An improved protective boot particularly suited for use in protecting the shaft of a shock absorber for the front fork of a motorcycle. The boot is characterized by an axially collapsible tubular body formed of substantially impervious, resilient material having multiple series of annular convolutions of mutually unique diameters for facilitating mutual nesting, each series comprising two pairs of convolutions of a truncated configuration adjacently related to a cylindrical annular convolution characterized by opposite walls defining an annular orifice the axial dimension of which varies in response to changes in the length of the shaft.

2 Claims, 4 Drawing Figures

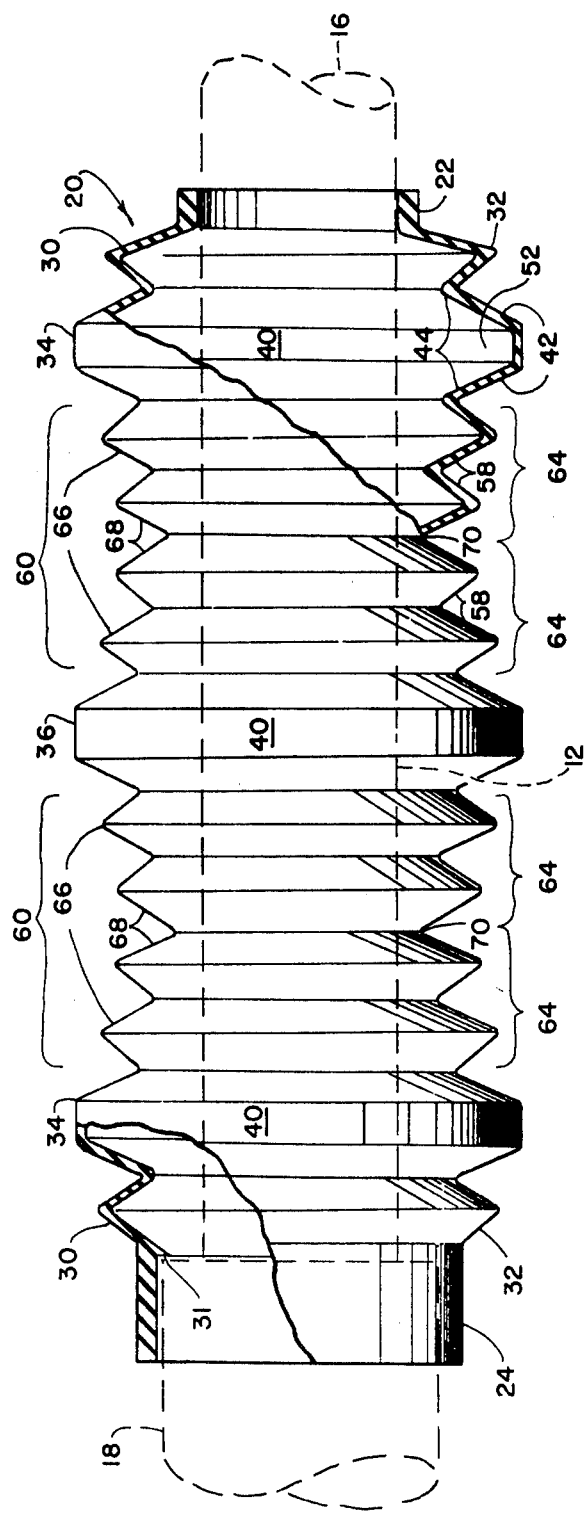
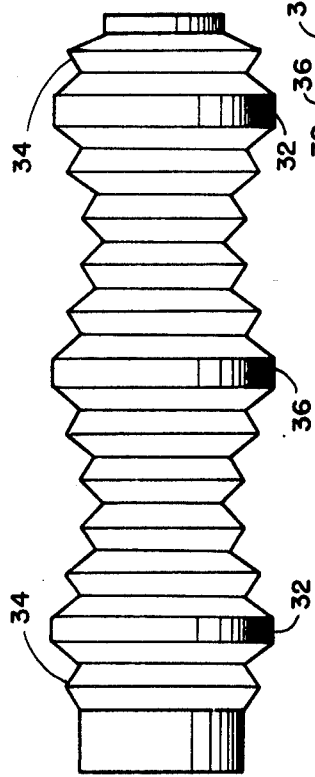
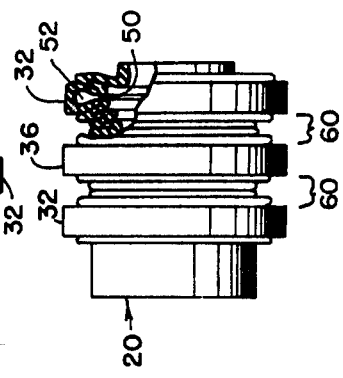
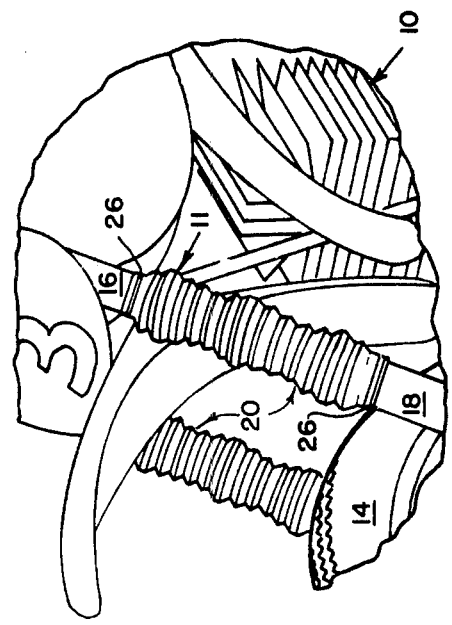

PROTECTIVE BOOT

BACKGROUND OF THE INVENTION

1. Field of the Invention

The invention generally relates to protective covers and more particularly to an improved "boot" for use in protecting the axially reciprocable shaft for a shock absorber for the front fork of a motorcycle.

2. Description of the Prior Art

The prior art, of course, is replete with protective boots for covering the finished surfaces of shafts, such as axially extensible shafts, shock absorbers, and the like. Such boots are particularly useful in those instances where the shaft of a shock absorber is to be protected from damage resulting from impact, corrosion, collection of abrasive materials and the like, as often as is required for shock absorbers provided for the front forks of motorcycles of a type commonly referred to as "dirt bikes."

Protective boots for the shafts of shock absorbers often include a multiplicity of annular convolutions which accommodate axial extension and/or contraction thereof. Unfortunately, dirt bikes are, in practice, subjected to excessive cyclic loading which tends to cause the shafts of the shock absorbers provided therefor to be foreshortened, or extended, through distances which exceed the elongation and contraction capabilities of the protective boots. As a consequence, the boots tend to rupture as a result of excessive elongation or excessive pressures developed within the boots as contraction occurs.

As can therefore be readily appreciated, there currently exists a need for a protective boot which is particularly suited for use in protecting the shafts of shock absorbers provided for the front forks of motorcycles, particularly those provided for dirt bikes.

It is therefore the general purpose of the instant invention to provide a protective boot having improved elongating and contracting capabilities, whereby operational longevity is enhanced.

OBJECTS AND SUMMARY OF THE PRESENT INVENTION

Accordingly, it is an object of the present invention to provide an improved protective boot.

Another object is to provide a boot for the shaft of a shock absorber provided for the front fork of a motorcycle.

Another object is to provide a protective boot capable of enduring repeated and extreme cyclical flexing without experiencing failure.

Another object is to provide a boot adapted to protect the shaft of a shock absorber without unduly impeding the shaft's action.

Another object is to provide such a protective boot for a collapsible shaft adapted to withstand air pressure developed therewithin as the shaft on which it is mounted contracts suddenly.

Another object is to provide such a protective boot which is light in weight and economical which will endure repeated cyclical flexing and extreme internal air pressure.

Another object is to provide a boot for protecting the shaft of a shock absorber provided for the front fork of a motorcycle characterized by a capability of being excessively foreshortened with attendant excessive radial expansion.

Another object is to provide a protective boot which is particularly useful in combination with a shaft of a shock absorber for the front fork of a motorcycle, although not necessarily restricted in the use thereto since the protective boot may be similarly useful when installed in protective relation with a reciprocating shaft of a general utility.

These together with other objects and advantages are achieved through the use of the tubular boot including adjacent series of adjacently disposed acuminate annular convolutions adapted to nest together for achieving a foreshortened configuration, and a plurality of mutually spaced annular convolutions characterized by peripheral walls of cylindrical configurations and radial walls of widths greater than the length of the peripheral wall defining plenum chambers having radial orifices communicating with the annular convolutions, the dimensions of the orifices varying proportionately with changes in the length of the boot for thus controlling the flow of air along a shaft on which the boot is mounted as the shaft is extended and retracted, as will become more readily apparent by reference to the following description and claims in light of the accompanying drawings.

BRIEF DESCRIPTION OF THE DRAWING

FIG. 1 is a fragmentary, perspective view of a motorcycle, depicting an operational environment for improved protective boots which embody the principles of the instant invention.

FIG. 2 is a side view of one of the boots shown in FIG. 1, with portions thereof being broken away for illustrative purposes.

FIG. 3 is a side view of the boot of FIG. 1, on a reduced scale, showing the boot in a fully extended configuration.

FIG. 4 is a side view of the boot shown in FIG. 1, also on a reduced scale, showing the boot in a fully shortened configuration, a portion of the boot is broken away to illustrate a nesting relationship for convolutions.

DESCRIPTION OF THE PREFERRED EMBODIMENT

Referring now with more particularity to the drawing, wherein like reference numerals designate like or corresponding parts thorughout the several views, there is shown a motorcycle 10 having a front fork designated 11 with a pair of conventional extensible shafts 12 provided with shock absorbers located on opposite sides of a front wheel 14.

Each shaft 12 is characterized by an upper end portion 16 and a lower end portion 18, frequently fitted in a mutually telescoping relationship. Upon each of the shafts 12 there is mounted an improved protective boot, generally designated 20 which embodies the principles of the instant invention. Each of the boots 20, in turn, is of a tubular configuration and includes an upper end portion 22 and lower end portion 24. These portions of the boot 20 are individually secured in circumscribing relation to the upper and lower portions of the shaft by a pair of suitable clamps 26. It is to be understood that each of the boots is of unitary construction and preferably is formed of an impervious, resilient material. In practice, the boot 20 is molded from a suitable blend of synthetic resins and natural rubber.

As best shown in FIG. 2, the boot 20 comprises an elongated tubular body characterized by a unitary, axially collapsible wall 30. The wall 30 is relatively thin in relation to its diameter, and is of a substantially uniform dimension.

As shown in the drawings, the wall 30 is formed into a plurality of contiguous annular convolutions arranged in coaxial alignment. The upper end portion 22 as well as the lower end portion 24 of the boot is provided with a cylindrical opening configured to be fitted to upper and lower end portions 16 and 18 of the shaft 12 of the front fork 11, as illustrated in FIG. 1. An annular shoulder 31 is formed inwardly of the opening formed in the lower end portion of the boot. When mounted, the shoulder 31 projects radially into engagement with the surface of the upper end portion, not designated, of the lower portion of a shaft 12. The opening in the upper end portion 22 of the boot 20, shown at the right in FIG. 2, is depicted as being of a somewhat smaller diameter than the opening provided for the opposite, lower end portion 24 of the boot. It will, of course, be appreciated that the relationship of the diameters of the openings and of shoulders, such as 31, are varied as desired in order to adapt the boot for use in given environments.

The wall 30 of the boot 20 also includes a pair of end convolutions 32. These convolutions are of acuminate configurations and substantially coaxially related to the cylindrical openings provided at the opposite end portions 22 and 24 of the boot. A pair 34 of end accumulator convolutions also is formed in the boot in juxtaposition with the end convolutions 32. As shown, a third accumulator convolution 36 is centrally disposed in the boot.

Each of the accumulator convolutions 34 and 36 includes a generally cylindrical peripheral wall 40 of somewhat larger diameter than the end convolutions 32. The accumulator convolutions also include side walls 42 extending generally radially from the opposite ends of the peripheral walls 40 and terminate at annular zones of articulation 44 through which the walls 42 are joined to the walls of adjacent convolutions. Between the zones 44 there is thus established axially extending annular orifices 50. The radial width dimension of the side walls 42 of each accumulator convolution 34 and 36, where desired, is slightly greater than the axial length dimension of the peripheral wall 40 thereof.

The disposition of side walls 42 of the accumulator convolutions is varied in accordance with the extent of extension or compression imposed on the boot. The walls 42 of each accumulator convolution can be inclined toward the opposite ends of the boot, as shown in FIG. 2, or inclined toward a common plane as illustrated in FIG. 4. Of course, as the boot 20 is compressed in an axial direction, the peripheral wall 40 and side walls 42 of each accumulator convolution serve to define a plenum chamber 52 communicating with a respective annular orifice 50, FIG. 4, which functions in a manner and for a purpose subsequently to be described.

Between each of the accumulator convolutions 34 and the accumulator convolution 36, there is arranged a series of collapsible convolutions 58 of annular acuminate configurations, generally designated 60. Because of the similarity in construction and function of the series 60 of convolutions 58, and in the interest of brevity, a detailed description of a single series 60 is hereinafter provided.

Each of the series 60 of acuminate convolutions is formed by two similar pairs 64 of adjacent collapsible convolutions 58. The collapsible convolutions 58 of each pair of convolutions 64 are characterized by mutually unique diameters so that each pair 64 is caused to assume a truncated conical configuration. The two pairs of convolutions 64 are disposed in mirror imaging, coaxial relation with the collapsible convolutions 58 of the larger diameter being, for the sake of convenience, characterized as base convolutions, designated 66, while the convolution of the smallest diameter is characterized by an apex convolution, designated 68. Each base convolution is connected to an adjacent accumulator convolution 34 at a zone of articulation 44, while the apex convolutions 68 of the two pairs 64 are joined at a zone of articulation, designated 70.

The "crest" or largest diameters of the base convolutions 66 are substantially equal to the corresponding diameters of the end convolutions 32. However, the crest diameters of the base convolutions 66 are somewhat smaller than the crest diameters of the peripheral walls 40 of the accumulator convolutions 34 and 36 but larger than the crest diameter of the adjacent apex convolution. The "root" or smallest diameter of each base convolution 66 is somewhat smaller than the smallest diameter of the adjacent accumulator convolution, but is somewhat larger than the diameters of the adjacent apex convolution. The common root diameters of adjacent apex convolutions tend, of course, to be equal.

In view of the foregoing, it should be apparent that the boot 20 comprises a multiplicity of coaxially aligned series 60 of nestable pairs of acuminate convolutions, as illustrated in FIG. 4.

Moreover, because of the truncated cone shape configuration of each pair of acuminate convolutions, the plenum chambers 52, defined within an accumulator convolution 34 and 36, are in substantial continuous air flow communication with the acuminate convolutions.

Finally, while the series 60 heretofore described is shown to comprise two pairs of collapsible convolutions 58, it will be appreciated that other numbers of convolutions are employed, as desired.

OPERATION

In view of the foregoing description of the preferred embodiment, it is believed that the operation thereof is clearly apparent. However, the operation is at this point briefly summarized.

The protective boot 20, in operation, is mounted on a shaft 12 of a selected front fork for a motorcycle. This is accomplished simply by sliding the boot over the upper portion 16 of the shaft until the opening in the lower end portion 24 of the boot fits in circumscribing relation with the upper end of the lower portion 18 of the shaft and an engaged relationship is established therebetween. The clamps 26 are then fitted about the peripheries of the upper end portion 22 and the lower end portion 24 of the boot for clamping these portions of the boot to the shaft.

The front wheel 14 of the motorcycle 10, of course, encounters uneven terrain as the motorcycle moves over the ground surface. The shafts 12 are thus caused to extend and foreshorten axially which, in turn, initiates corresponding extensions and foreshortenings of the protective boot 20. As the boot is extended, it assumes an elongated configuration, as illustrated in FIG. 3. However, as the boot is foreshortened, the side walls of the collapsible convolutions 58 as well as the end convolutions 32 are brought into closer proximity until adjacent side walls are engaged. Ultimately, as the boot is foreshortened, the collapsible convolutions 58 of the pairs 64 are forced into a nested relationship with each other and, finally, are nested within accumulator convolutions 34 and 36, as illustrated in FIG. 4.

Since the convolutions 58 can assume nested relationship, the boot 20 can be foreshortened to a greater extent than is possible for a boot of the same extended length having the same number of convolutions all of substantially common diameter. That is to say, the boot embodying the principles of the present invention has a greater range of axial extension and foreshortening than does a boot of conventional construction of the same extended length. This capability has certain attendant desirable characteristics among which is increased operational longevity.

Additionally, it will at this point be recognized that the opposite ends of a protective boot 20 are clamped to the shaft 12 and that air is trapped within the boot. Moreover, this air is compressed as the boot is foreshortened in response to changes in the length of the shaft. As the shaft is foreshortened, the convolutions 58 collapse so that air entrapped within the boot is progressively transferred from the smaller collapsible convolutions to the larger collapsible convolutions and, ultimately, when the boot and shaft are fully foreshortened, to the plenum chambers 52 defined within the accumulator convolutions 34 and 36. Maximum pressures are developed as the plenum chamber reaches its smallest volume, and this volume occurs when the collapsible convolutions cannot expand radially. Further, since the side walls 42 of the accumulator convolutions 34 and 36 are extended substantially radially at the instant maximum pressure, the peripheral wall 40 of the accumulator convolutions is restrained from expanding radially. By inhibiting radial expansion of the boot, any tendency for the boot to engage the wheel is greatly reduced.

Additionally, the flow of air into each plenum chamber 52 is controlled by the variable dimensions of annular orifices 50 of the accumulator convolutions 34 and 36. The axial length of these orifices is substantially proportional to the instantaneous overall length of the boot 20 which, of course, varies in response to changes in the axial length of the shaft 12. Since each annular orifice is smallest when the effective volume of its respective plenum chamber is the smallest, and, consequently, the air pressure developed within the plenum chambers is the greatest, the flow of air is restricted in proportion to the pressure developed. Thus control over axial air flow is achieved within the protective boot.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In combination with a shaft of a shock absorber, an axially collapsible boot segment having a configuration conforming to a pair of coaxially aligned, commonly dimensioned truncated cones, joined at the planes of truncation thereof, comprising:

A. at least one pair of commonly dimensioned annular convolutions of a first configuration disposed in axially spaced, coaxial alignment, each convolution of said pair being characterized by a peripheral wall of a substantially cylindrical configuration and a pair of substantially radially extended annular walls intersecting said peripheral wall and having inside diameters of a common dimension; and B. a plurality of at least three juxtaposed annular convolutions of a second configuration interposed in juxtaposition between the pair of annular convolutions of said first configuration, each convolution of said plurality being characterized by a pair of substantially radially extended annular walls intersecting to define an acuminate periphery, the outside diameter of each convolution of the second configuration adjacently related to a convolution of said first configuration being less than the internal diameter of the peripheral wall thereof and greater than the outside diameter of the juxtaposed convolution of the second configuration, whereby a nesting of the convolutions characterized by a lesser outside diameter within the convolutions characterized by a greater outside diameter is facilitated.

2. The boot of claim 1 wherein the annular walls of each convolution of the second configuration are characterized by inside diameters of unequal dimensions.

* * * * *

UNITED STATES PATENT AND TRADEMARK OFFICE
CERTIFICATE OF CORRECTION

PATENT NO. : 4,114,460
DATED : September 19, 1978
INVENTOR(S) : Takao R. Oto

It is certified that error appears in the above-identified patent and that said Letters Patent are hereby corrected as shown below:

Column 1, line 18, delete "as".

Signed and Sealed this

Nineteenth Day of December 1978

[SEAL]

Attest:

RUTH C. MASON
*Attesting Officer*

DONALD W. BANNER
*Commissioner of Patents and Trademarks*